United States Patent [19]

Dye et al.

[11] E Re. 29,173

[45] Reissued Apr. 5, 1977

[54] LASER TRANSMITTER SYSTEM

[75] Inventors: Richard A. Dye; C. Raymond Berry, both of Santa Barbara, Calif.

[73] Assignee: Santa Barbara Research Center, Goleta, Calif.

[22] Filed: June 18, 1976

[21] Appl. No.: 697,584

Related U.S. Patent Documents

Reissue of:

[64] Patent No.: 3,909,745
Issued: Sept. 30, 1975
Appl. No.: 515,810
Filed: Oct. 17, 1974

[52] U.S. Cl. ..... 331/94.5 PE; 250/199

[51] Int. Cl.[2] ..... H01S 3/096

[58] Field of Search ..... 331/94.5; 315/240–243; 250/199

[56] References Cited

UNITED STATES PATENTS 3,341,708 9/1967 Bilderback ..... 331/94.5 PE 3,766,492 10/1973 Rosati ..... 331/94.5 PE

OTHER PUBLICATIONS

Diode Laser Transmits Audio, Electronics (May 31, 1963), p. 16.

*Primary Examiner*—William L. Sikes
*Attorney, Agent, or Firm*—Rafael A. Cardenas; W. H. MacAllister

[57] ABSTRACT

A laser transmitter system is disclosed which utilizes mechanical energy for generating an output pulse. The laser system includes a current developing device such as a piezoelectric crystal which charges a storage device such as a capacitor in response to a mechanical input signal. The capacitor is coupled to a switching device, such as a silicon controlled rectifier (SCR). The switching device is coupled to a laser transmitter such as a GaAs laser diode, which provides an output signal in response to the capacitor being discharged.

6 Claims, 3 Drawing Figures

LASER TRANSMITTER SYSTEM

Matter enclosed in heavy brackets [ ] appears in the original patent but forms no part of this reissue specification; matter printed in italics indicates the additions made by reissue.

FIELD OF THE INVENTION

This invention relates generally to a laser transmitter system and particularly to a self operating laser transmitter system utilizing mechanical energy for controlling a laser to generate and transmit an energy pulse.

DESCRIPTION OF THE PRIOR ART

Systems using semiconductor GaAs lasers have been developed to train military personnel in using the M-16 rifle. The laser system is attached to a rifle and fires infrared laser "bullets" at infrared detector equipped targets. The targets may be coupled into a computer which scores hits whenever infrared energy strikes the detectors. Power is supplied to the laser transmitter by cumbersome batteries that are carried on the soldier's person and which are connected to the rifle via bulky cables.

Piezoelectric crystals have been used to generate a spark for lighting a gas stove, a gas cigarette lighter, and for firing a photoflash bulb without external batteries or electrical power. However, piezoelectric crystals have not been used to provide an infrared pulse in response to a mechanical input signal.

SUMMARY OF THE INVENTION

Accordingly, it is the object of the present invention to provide a simple and reliable laser transmitter system.

It is another object of the present invention to provide a laser transmitter system for providing an output pulse in response to a mechanical input signal.

It is another object of the present invention to provide a lightweight laser transmitter system requiring no external electrical power source.

It is still another object of the present invention to provide a laser signaling system that is compact and completely self-contained.

In accordance with the foregoing objects, a laser transmitter system according to the invention includes a piezoelectric device coupled to a storage device for storing the energy developed by the piezoelectric device. The energy storage device is coupled to a laser transmitter by a switching device. In response to a signal from the piezoelectric device, the storage device is discharged through the laser transmitter thereby producing an output signal.

DETAILED DESCRIPTION OF THE DRAWINGS

Figure 1:
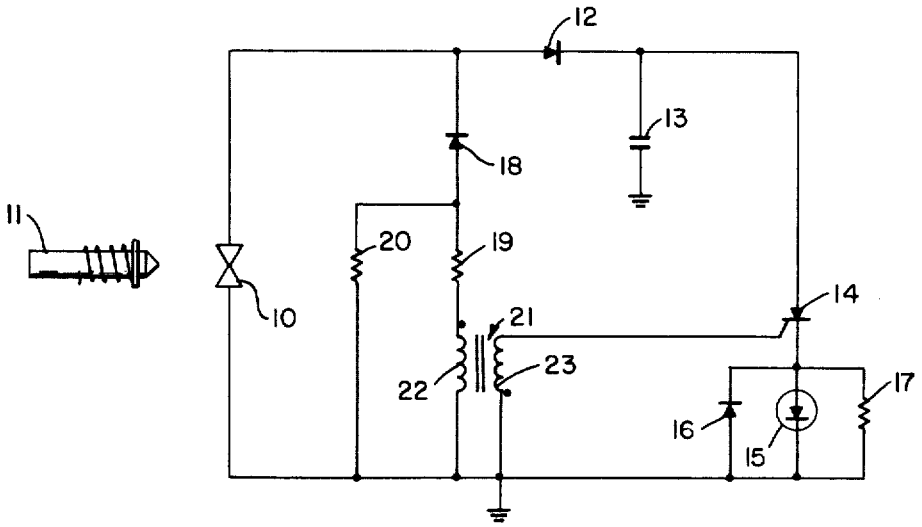
FIG. 1 is a schematic circuit diagram of a first embodiment of the present invention.

Referring more specifically to FIG. 1, a laser transmitter system is depicted for generating an infrared pulse in response to a mechanical input signal. According to the present invention, a laser transmitter system includes a piezoelectric crystal 10 that is excited to produce an output signal by a mechanical force that may be provided by a device such as a spring loaded hammer 11, for example. A first electrode of the crystal 10 is coupled to ground and a second electrode is coupled to the anode electrode of a first diode 12. A storage capacitor 13 is coupled between the cathode electrode of the diode 12 and ground. The cathode electrode of the diode 12 is also coupled to the anode electrode of a silicon controlled rectifier (SCR) 14. Other suitable switching devices may be utilized in place of the SCR 14. A laser transmitter, such as a GaAs laser diode 15, is connected between the cathode electrode of the SCR 14 and ground. A second diode 16 for preventing a reverse voltage from damaging the laser diode 15, is connected in parallel with the laser diode 15. A load resistor 17 is also connected in parallel with the laser diode 15. The cathode electrode of a third diode 18 is connected to the second electrode of the piezoelectric crystal 10. The anode electrode of the diode 18 is connected to first electrodes of resistors 19 and 20. The second electrode of the resistor 20 is connected to ground. The primary winding 22 of a transformer 21 is connected between the second electrode of the resistor 19 and ground. The secondary winding 23 of the transformer 21 is connected between the gate electrode of the SCR 14 and ground. The transformer 21 is for purposes of isolation and for stepping down the voltage generated by the piezoelectric crystal 10 and may be eliminated if the gate electrode of the SCR 14 can withstand the high voltage. Also the control signal to the gate electrode of the SCR 14 may be supplied by another suitable triggering circuit.

Figure 2:
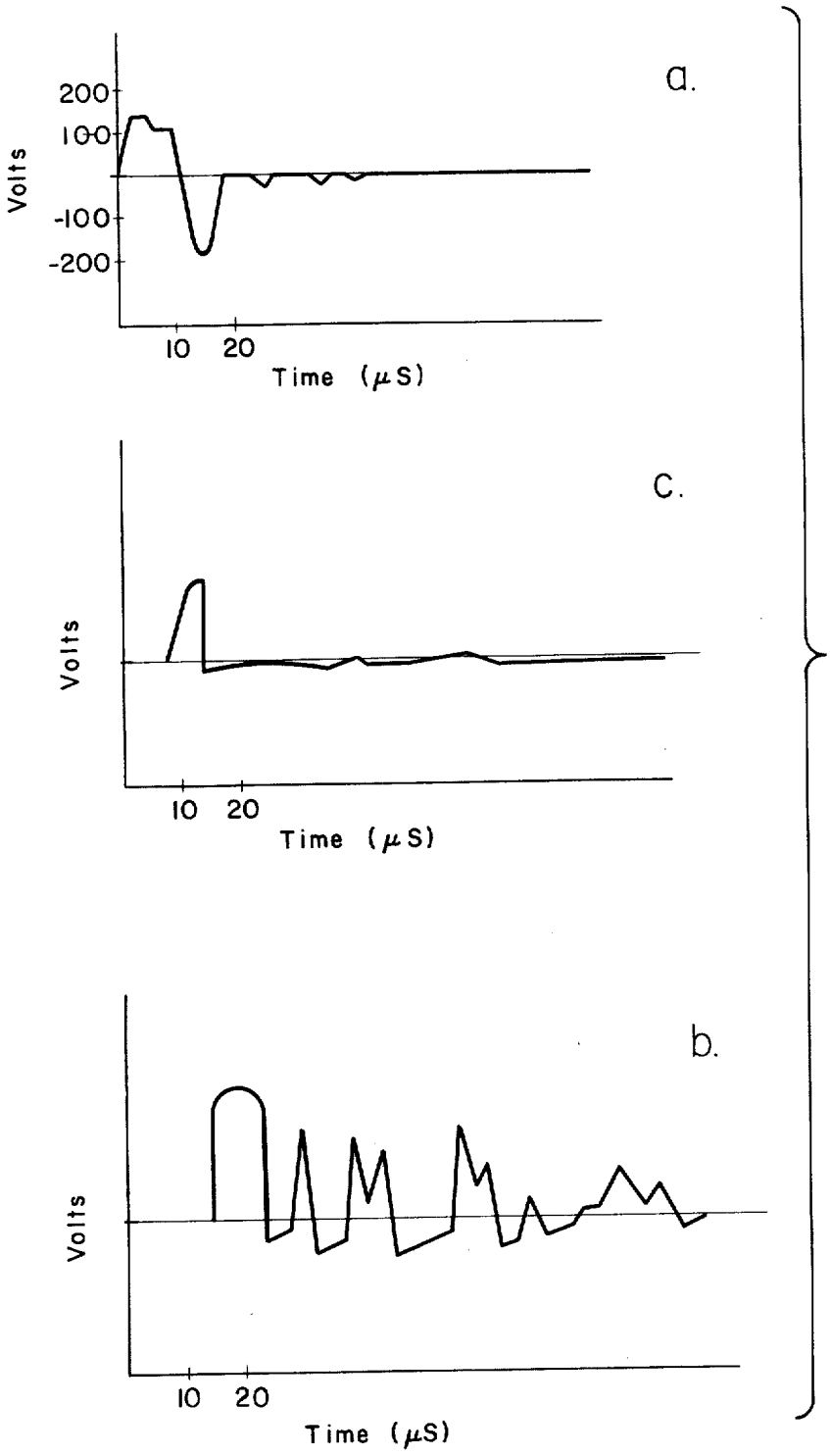
FIGS. 2a–2c are diagrams of waveforms representing voltages as a function of time at various points in the circuit according to FIG. 1.

The operation of the invention according to FIG. 1 is now described with respect to FIGS. 2a–2c wherein a force 11 is applied to the piezoelectric crystal 10 causing that crystal to supply an output signal as illustrated in FIG. 2a. It is noted that the output signal is an AC waveform, since the crystal may ring as a result of the applied mechanical force. During the positive half cycle of the output signal from the crystal 10, the diode 12 is forward biased thereby charging the storage capacitor 13 since the SCR 14 is not conducting at this time.

During the negative half cycle output signal from the crystal 10, the diode 12 is reverse biased and the third diode 18 is forward biased which induces a current flow through the primary winding 22 of the transformer 21. The secondary winding 23 provides an output signal to the gate of the SCR 14 which triggers and establishes a current path between the capacitor 13 and the laser diode 15. The waveform of the signal to the gate of the SCR 14 is illustrated in FIG. 2b.

Referring now to FIG. 2c, the waveform of the SCR anode to ground, the SCR 14, in response to the signal on the control gate the SCR 14 discharges the storage capacitor 13 through the laser diode 15 which produces an infrared output pulse. The output pulse may be detected by remotely located IR detectors.

Figure 3:
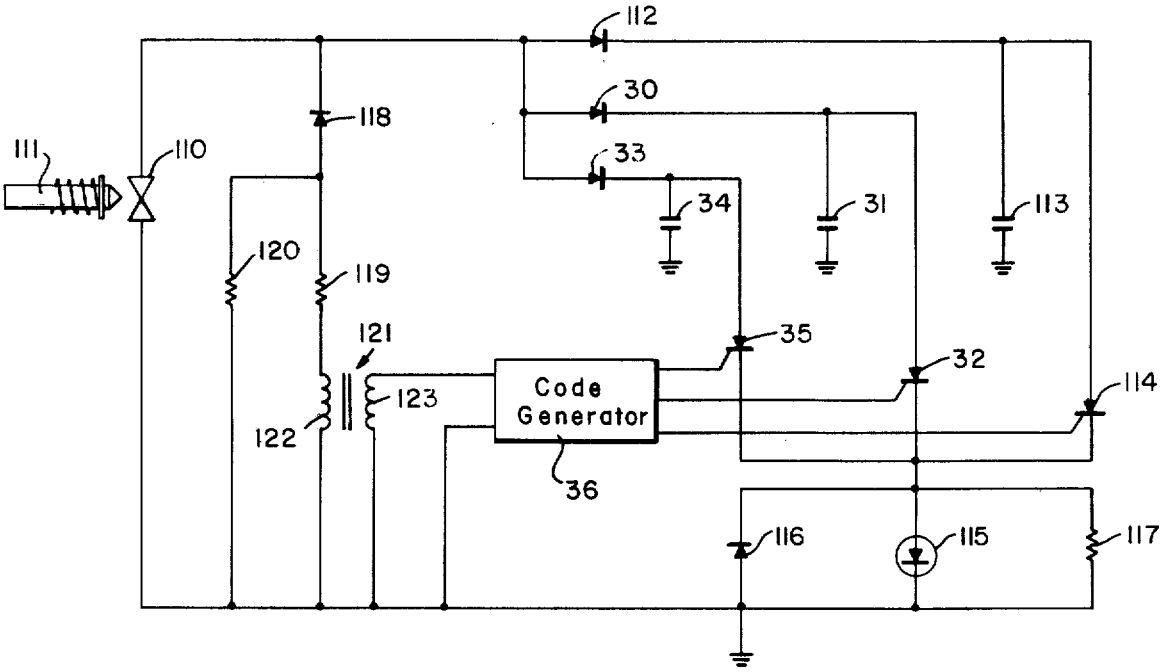
FIG. 3 is a schematic circuit diagram of a second embodiment of the present invention.

Referring now to FIG. 3, another embodiment of the present invention is now described. Elements of the circuit of FIG. 3 that are similar to elements of the circuit in FIG. 1 will have the same reference designation number but will be prefixed by the numeral "1".

According to the second embodiment of the present invention, a laser transmitter system includes a piezoelectric crystal 110 having first and second electrodes, which crystal is excited to produce an output signal by a mechanical device such as the spring-loaded hammer 111. The first electrode of the crystal 110 is coupled to ground and the second electrode is coupled to the anode electrode of a first diode 112. A storage capacitor 113 is coupled between the cathode electrode of the diode 112 and ground. The cathode electrode of the diode 112 is also coupled to the anode electrode of a first silicon controlled rectifier (SCR) 114 which discharges the capacitor 113 in response to a trigger signal.

A GaAs laser diode 115 is connected between the cathode electrode of the SCR 114 and ground. The gate electrode of the SCR 114 is connected to a first output terminal of a pulse code generator 36. A second diode 116 and a resistor 117 are connected in parallel with the GaAs diode 115. The anode electrodes of third and fourth diodes 30 and 33 are coupled to the first electrode of the piezoelectric crystal 110. The cathode electrodes of the diodes 30 and 33 are coupled to second and third storage capacitors 31 and 34, respectively. The cathode electrodes of the diodes 30 and 33 are also coupled to the anode electrodes of second and third SCRs 32 and 35, respectively. The cathode electrodes of the SCRs 32 and 35 are also connected to the GaAs laser diode 115. The gate electrodes of the SCRs 32 and 35 are coupled to second and third output terminals of the pulse code generator 36. The SCRs 32 and 35 discharge the storage capacitors 31 and 34, respectively, in response to trigger signals on their respective control gates from the pulse code generator 36 at a predetermined time.

The cathode electrode of a fifth diode 118 is connected to the second electrode of the piezoelectric crystal 110. The anode electrode of the diode 118 is connected to first electrodes of resistors 119 and 120. The second electrode of the resistor 120 is connected to ground. The primary winding 122 of an isolation and stepdown transformer 121 is connected between the second electrode of the resistor 119 and ground. The first terminal of the secondary winding 123 of the transformer 121 is connected to a first input terminal of a pulse code generator 36. The second terminal of the secondary winding 122 and a second input terminal of the pulse code generator 36 are connected to ground. The pulse code generator is for selectively discharging the storage capacitors in a predetermined time sequence. This predetermined time sequence is useful to transmit code messges having more information than an "on-off" signal represented as a single pulse of the first embodiment. Since pulse code generators are generally known in the art, a particular pulse code generator is not described herein.

The operation of the circuit according to FIG. 3 is similar to the operation of the circuit of FIG. 1 except that the laser diode 115 may provide a series of output pulses in a predetermined time sequence as a result of the storage capacitors 113, 31 and 34 being selectively discharged through the laser diode 115 at preselected times. Thus a coded output is generated by the laser transmitter system. The coded output signal from the laser transmitter system may be decoded by a suitable decoding system utilizing IR detectors.

It should be apparent from the foregoing that the present invention provides a simple and reliable laser transmitter system for converting mechanical energy into an infrared output pulse from a laser diode.

Although the present invention has been shown and described with reference to particular embodiments, nevertheless, various changes and modifications obvious to one skilled in the art to which this invention pertains are deemed to lie within the purview of the invention.

What is claimed is:

1. A laser transmitter system comprising: mechanical energy-producing means;

piezoelectric means for providing electrical signals in response to said mechanical energy-producing means;

a first diode coupled between said piezoelectric means and a storage capacitor;

a storage capacitor coupled to said first diode, said capacitor being charged in response to said piezoelectric means;

silicon controlled rectifier having first, second and third electrodes, said first electrode being coupled to said first diode, said silicon controlled rectifier for discharging said capacitor in response to a signal applied to said third electrode of said rectifier;

laser diode means coupled to said second electrode of said silicon controlled rectifier for providing an output signal in response to current being discharged therethrough;

a second diode being coupled between said piezoelectric device and a transformer; and a transformer having primary and secondary windings, said primary winding being coupled to said second diode, said secondary winding being coupled to said third electrode of said silicon controlled rectifier, said transformer for providing a signal to said third electrode of said silicon controlled rectifier in response to said piezoelectric means.

2. A laser transmitting system comprising:

a piezoelectric means for providing electrical output signals in response to a mechanical input signal;

a first diode coupled to said piezoelectric means;

a capacitor coupled to said first diode, said capacitor storing energy in response to said piezoelectric means;

switching means having a current path and a control electrode, said current path being coupled to said capacitor for conducting energy stored in said capacitor in response to a signal applied to said control electrode;

laser means coupled to said current path of said switching means for providing an output signal in response to energy being conducted therethrough;

transformer means coupled between said piezoelectric means and said control electrode of said switching means, said transformer providing a signal to said control electrode of said switching means in response to said piezoelectric means.

3. A laser transmitter system comprising:

piezoelectric means for providing an electrical output signal in response to a mechanical input signal;

a first diode coupled between said piezoelectric means and a capacitor;

a capacitor coupled to said first diode, said capacitor for storing energy in response to a said piezoelectric means;

switch means having a current path and a control electrode, said current path coupled between said capacitor and laser means, for discharging said capacitor in response to a signal applied to said control electrode;

means coupling said piezoelectric means and said control electrode of said switching means for providing said control electrode with a control signal;

laser means coupled to said current path of said switch means for emitting an output signal in response to said capacitor being discharged.

4. A laser transmitter system comprising:

a piezoelectric means for providing output signals in response to a mechanical input signal;

energy storing means coupled to said piezoelectric means for storing energy in response to said piezoelectric means;

laser means for emitting an output signal in response to energy being discharged therethrough;

switching means having a current path and a control electrode, said current path being coupled between said energy storing means and said laser means for discharging said energy means through said laser means in response to a signal applied to said control electrode; and means coupled to said control electrode of said switching means for providing a signal thereto.

5. A laser transmitter system comprising:

piezoelectric means for providing an output signal in response to a mechanical input signal;

energy storing means coupled to said piezoelectric means for storing energy therefrom;

laser means for emitting an output signal in response to the discharge of said energy storing means;

switch means coupling said energy storing means and said laser means, said switching means having a control electrode for switching said switching means into conduction in response to a control signal; and means coupled to said control electrode providing a control signal to said control electrode to discharge said energy storing means through said laser diode means thereby producing an output signal.

6. A laser transmitter system comprising:

piezoelectric means providing an output signal in response to a mechanical input signal;

a plurality of energy storing means coupled to said piezoelectric means for storing energy therefrom;

laser means emitting an output signal in response to the discharge of any of said energy storing means;

a plurality of switch means each having a current path and a control electrode, said current paths respectively coupling said plurality of energy storing means to said laser means for selectively discharging said energy storing means in response to control signals being selectively applied to said control electrodes at predetermined periods of time for providing a coded output signal from said laser means; and means coupled to said plurality of control electrodes for providing preselected-timed signals to said control electrodes of said switching means.

* * * * *